US007990970B2

(12) United States Patent
Matsuba

(10) Patent No.: US 7,990,970 B2
(45) Date of Patent: Aug. 2, 2011

(54) DATA TRANSMISSION APPARATUS, ADDRESS SETTING METHOD FOR THE APPARATUS, AND ADDRESS SETTING PROCESSING PROGRAM

(75) Inventor: Takafumi Matsuba, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 530 days.

(21) Appl. No.: 11/785,236

(22) Filed: Apr. 16, 2007

(65) Prior Publication Data

US 2007/0280131 A1 Dec. 6, 2007

(30) Foreign Application Priority Data

May 1, 2006 (JP) .................. 2006-127937

(51) Int. Cl.
*H04L 12/28* (2006.01)
*H04L 12/56* (2006.01)
*H04M 11/00* (2006.01)
*G06F 7/00* (2006.01)
*G06F 17/30* (2006.01)

(52) U.S. Cl. ........ 370/392; 370/351; 370/389; 455/403; 455/405; 707/705; 707/708

(58) Field of Classification Search .................. 370/351, 370/389, 392; 455/445, 403, 405; 707/705, 707/708

See application file for complete search history.

(56) References Cited

U.S. PATENT DOCUMENTS

| 6,614,892 B1 | 9/2003 | Hashimoto et al. |
| 6,880,019 B1 | 4/2005 | Toyoda |
| 6,963,417 B1 | 11/2005 | Saito |
| 7,000,157 B2 | 2/2006 | Okamoto et al. |
| 7,187,932 B1 * | 3/2007 | Barchi ............ 455/445 |
| 7,634,463 B1 * | 12/2009 | Katragadda et al. ......... 707/3 |
| 2003/0177368 A1 * | 9/2003 | Morita et al. ............ 713/185 |
| 2005/0097171 A1 * | 5/2005 | Hikichi ............ 709/204 |
| 2007/0118887 A1 * | 5/2007 | Roskind ............ 726/5 |

FOREIGN PATENT DOCUMENTS

| JP | 05-048862 A | 2/1993 |
| JP | 5-227340 | 9/1993 |
| JP | 07-177215 A | 7/1995 |
| JP | 11-220600 | 8/1999 |
| JP | 2000-132301 | 5/2000 |

OTHER PUBLICATIONS

Notification of Allowance in JP 2006-127937 dated Feb. 19, 2008, and Translation thereof.

* cited by examiner

*Primary Examiner* — Pankaj Kumar
*Assistant Examiner* — Gautam Sharma
(74) *Attorney, Agent, or Firm* — Buchanan Ingersoll & Rooney PC

(57) ABSTRACT

A data transmission apparatus includes a transmitting portion capable of transmitting data to an address set by a user's transmission operation, a counter portion for counting the number of past transmissions every address, a storing portion for storing a transmission history including the counted number of past transmissions in an updatable manner, a registering portion for automatically registering an address whose number of past transmissions has reached a prescribed number, a displaying portion for displaying an address setting screen, a discrimination portion for discriminating whether there is a transmission history to the automatically registered address as to the user who transmits, and a controlling portion for making the displaying portion display the automatically registered address in a selectable manner on the address setting screen of the displaying portion only when it is discriminated by the discrimination portion that there is the transmission history.

17 Claims, 10 Drawing Sheets

| Automatic registration | Type | Address | Threshold | Number of counts | Transmitted User |
|---|---|---|---|---|---|
| OFF | E-mail | abc@aaa.ne.jp | 20 | 7 | UserA,UserB,UserC,UserD |
| OFF | FAX | 0123-45-6789 | 10 | 9 | UserA,UserB |
| OFF | E-mail | kimura@aaa.ne.jp | 20 | 19 | UserA,UserB,UserC |
| OFF | FAX | 0011-54-9876 | 10 | 9 | UserB,UserD |

FIG.3A

User A transmits an e-mail to the address "kimura"

| Automatic registration | Type | Address | Threshold | Number of counts | Transmitted User |
|---|---|---|---|---|---|
| OFF | E-mail | abc@aaa.ne.jp | 20 | 7 | UserA,UserB,UserC,UserD |
| OFF | FAX | 0123-45-6789 | 10 | 9 | UserA,UserB |
| OFF | E-mail | kimura@aaa.ne.jp | 20 | 20 | UserA,UserB,UserC |
| OFF | FAX | 0011-54-9876 | 10 | 9 | UserB,UserD |

FIG.3B

The address "kimura" will be automatically registered and become an address candidate

| Automatic registration | Type | Address | Threshold | Number of counts | Transmitted User |
|---|---|---|---|---|---|
| OFF | E-mail | abc@aaa.ne.jp | 20 | 7 | UserA,UserB,UserC,UserD |
| OFF | FAX | 0123-45-6789 | 10 | 9 | UserA,UserB |
| ON | E-mail | kimura@aaa.ne.jp | 20 | 20 | UserA,UserB,UserC |
| OFF | FAX | 0011-54-9876 | 10 | 9 | UserB,UserD |

FIG.3C

User D transmits an e-mail to the address "kimura"

| Automatic registration | Type | Address | Threshold | Number of counts | Transmitted User |
|---|---|---|---|---|---|
| OFF | E-mail | abc@aaa.ne.jp | 20 | 7 | UserA,UserB,UserC,UserD |
| OFF | FAX | 0123-45-6789 | 10 | 9 | UserA,UserB |
| ON | E-mail | kimura@aaa.ne.jp | 20 | 21 | UserA,UserB,UserC,UserD |
| OFF | FAX | 0011-54-9876 | 10 | 9 | UserB,UserD |

FIG.3D

DATA TRANSMISSION APPARATUS, ADDRESS SETTING METHOD FOR THE APPARATUS, AND ADDRESS SETTING PROCESSING PROGRAM

This application claims priority under 35 U.S.C. §119 to Japanese Patent Application No. 2006-127937 filed on May 1, 2006, the entire disclosure of which is incorporated herein by reference in its entirety.

BACKGROUND OF THE INVENTION

1. Field of the Invention

The present invention relates to, inter alia, a data transmission apparatus preferably for use in a digital complex machine, such as, e.g., a MFP (Multi Function Peripheral) or a facsimile machine, an address setting method for the data transmission apparatus, and an address setting processing program stored on a computer readable medium for making a computer of a data transmission apparatus execute address setting processing.

2. Description of the Related Art

The following description sets forth the inventor's knowledge of related art and problems therein and should not be construed as an admission of knowledge in the prior art.

In the aforementioned MFP, for example, a data transmission by a Scan-to-Email operation or a facsimile transmission to the same recipient (the same address) is often performed among a plurality of operating users. However, such transmission is often performed without preliminarily registering the address since the frequency of such transmission is relatively low for the respective operating users. In such a case, it was inconvenient for the users since it is required to input the address every transmission.

In order to solve such inconvenience, there has been proposed a technique in which the number of transmissions is counted every address not on the address inputted user basis but on the entire apparatus basis to automatically register addresses with larger numbers of transmissions and display the automatically registered addresses regardless of the operating user (see, e.g., Japanese Unexamined Laid-open Patent Publication No. H05-48862).

On the other hand, also known is a technique in which the number of transmissions to each address is counted every user who inputted the address to automatically register the addresses with larger number of transmissions and display the registered addresses only to the user (see, e.g., Japanese Unexamined Laid-open Patent Publication No. H07-177215).

In the technique as disclosed in Japanese Unexamined Laid-open Patent Publication No. H05-48862, however, since it is configured to display all of the automatically registered addresses regardless of operating users, the addresses will also be displayed to a user who first sets an address, which may cause an unnecessary transmission, such as, e.g., an unintentional transmission to an address similar to an intended address.

Furthermore, such a display of all of the automatically registered addresses regardless of operating users reveals another user's transmission histories, which raises a security problem.

On the other hand, in the technique as disclosed in Japanese Unexamined Laid-open Patent Publication No. H07-177215, since it is configured to count the number of transmissions to each address every user who inputted an address, no address will be registered for a user having less opportunity to perform a transmission. This is inconvenient for such a user.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a data transmission apparatus capable of automatically registering addresses, preventing a transmission to a wrong recipient, and ensuring a security, which is friendly even to a user having less transmission opportunity.

Among other potential advantages, some embodiments can provide an address setting method for the data transmission apparatus.

Among other potential advantages, some embodiments can provide an address setting processing program stored on a computer readable medium for making a computer of a data transmission apparatus execute address setting processing.

According to a first aspect of the preferred embodiment of the present invention, a data transmission apparatus, comprising:

a transmitting portion capable of transmitting data to an address set by a user's transmission operation;

a counter portion for counting the number of past transmissions every address;

a storing portion for storing a transmission history including the counted number of past transmissions in an updatable manner;

a registering portion for automatically registering an address whose number of past transmissions has reached a prescribed number;

a displaying portion for displaying an address setting screen;

a discrimination portion for discriminating whether there is a transmission history to the automatically registered address as to the user who transmits; and a controlling portion for making the displaying portion display the automatically registered address in a selectable manner on the address setting screen of the displaying portion only when it is discriminated by the discrimination portion that there is the transmission history.

According to a second aspect of the preferred embodiment of the present invention, an address setting method, including the steps of:

transmitting data to an address set by a user's transmission operation;

counting the number of past transmissions every address;

storing a transmission history including the counted number of past transmissions in a storing portion;

automatically registering an address whose number of past transmissions has reached a prescribed number;

displaying an address setting screen on a displaying portion;

discriminating whether there is a transmission history of the automatically registered address as to a user who transmits; and displaying the automatically registered address on the address setting screen of the displaying portion only when it is discriminated that there is the transmission history.

According to a third aspect of the preferred embodiment of the present invention, an address setting processing program stored on a computer readable medium for making a computer of a data transmission apparatus execute the step of:

transmitting data to an address set by a user's transmission operation;

counting the number of past transmissions every address;

storing a transmission history including the counted number of past transmissions in a storing portion;

automatically registering an address whose number of past transmissions has reached a prescribed number;

displaying an address setting screen on a displaying portion;

discriminating whether there is a transmission history of the automatically registered address as to a user who transmits; and displaying the automatically registered address on the address setting screen of the displaying portion only when it is discriminated that there is the transmission history.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 3(A) to 3(D) are figures showing the contents of the transmission history data base created by the data base creation processing portion 5;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
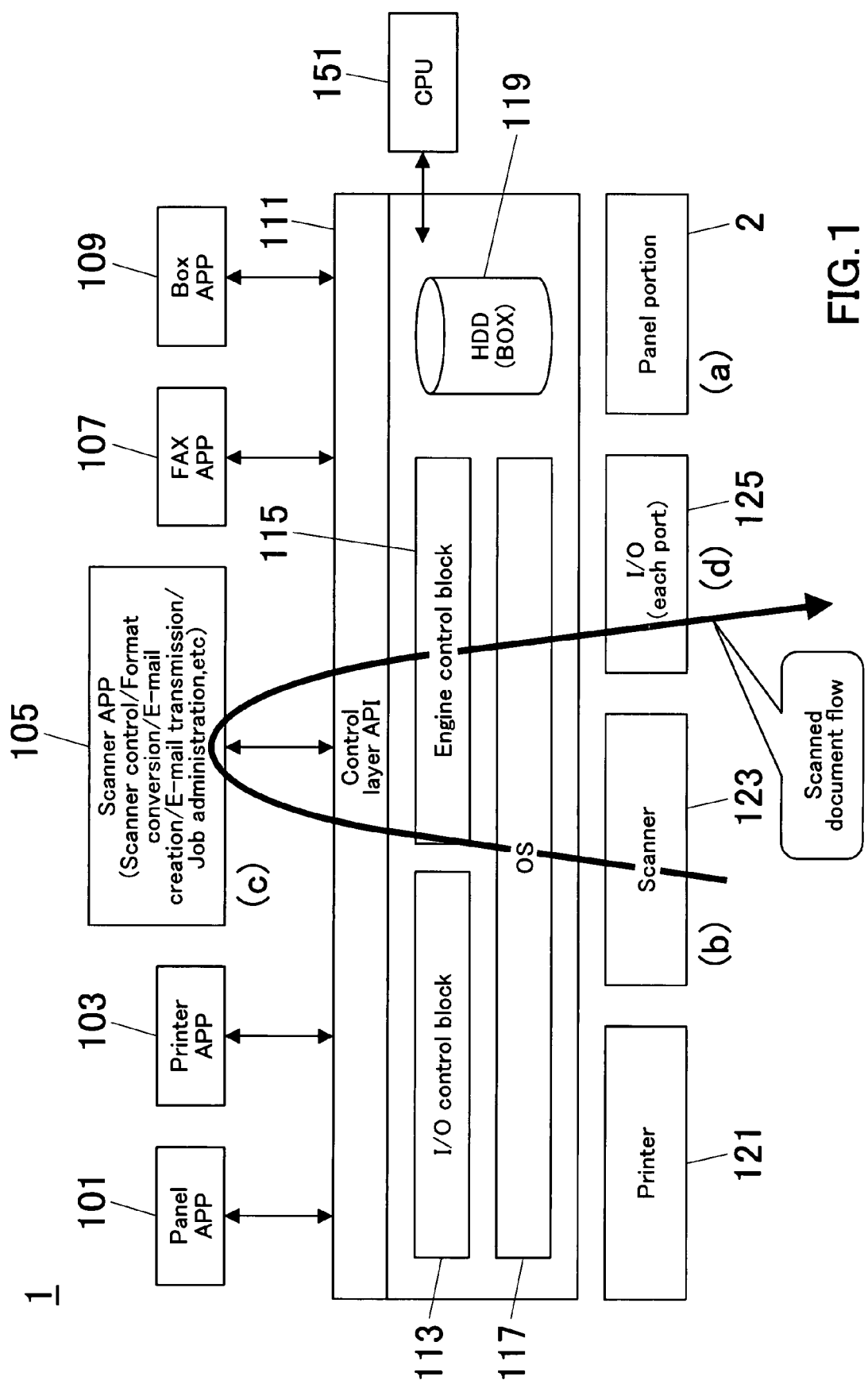
FIG. 1 is a block diagram showing a functional structure of a MFP to which a data transmission apparatus according to an embodiment of the present invention is applied.

FIG. 1 is a functional block diagram showing an MFP to which a data transmission apparatus according to an embodiment of the present invention is applied.

In FIG. 1, this MFP 1 is equipped with various functions, such as, e.g., a scanner function, a copy function, a facsimile function, a printer function, and an e-mail transmission function.

This MFP 1 has a panel application (Panel APP) 101 for controlling an operation panel portion 2, a printer application (Printer APP) 103 for a printer control, a scanner application (Scanner APP) 105 for a scanner control, a CPU 151 for executing these applications to perform various kinds of processing, a facsimile application (FAX APP) 107, and a box application (Box APP) 109 for controlling a box (e.g., hard disk drive) 119 for storing image data.

The scanner application (Scanner APP) 105 is a software program for executing various processing, such as, e.g., scanner control, format conversion, e-mail creation, e-mail transmission, or job management.

The MFP 1 is equipped with a control layer API (Application Program Interface) 111, an I/O control block 113, an engine control block 115, an OS (Operating System) 117, and a hard disk drive (box) 119.

The MFP 1 has a printer 121, a scanner 123 as a reading means, an I/O 125, and an operation panel portion 2 as hardwares.

The operation panel portion 2 has a structure in which, for example, a touch panel is laminated on a liquid crystal display apparatus (hereinafter referred to as "LCD"), so that one-touch buttons can be displayed on the LCD and the pressing of the one-touch buttons can be detected.

Now, the data transmission by the Scan-To-E-mail will be explained briefly. Reading of a manuscript is performed by the scanner 123 ("b" in FIG. 1) through the operation at the operation panel portion 2 ("a" in FIG. 1). An e-mail is created based on the read data, and then the e-mail transmission is performed ("c" in FIG. 1).

Thereafter, the data will be transmitted outside via the I/O 125 ("d" in FIG. 1). The bold arrow in FIG. 1 shows the aforementioned data flow.

Figure 2:
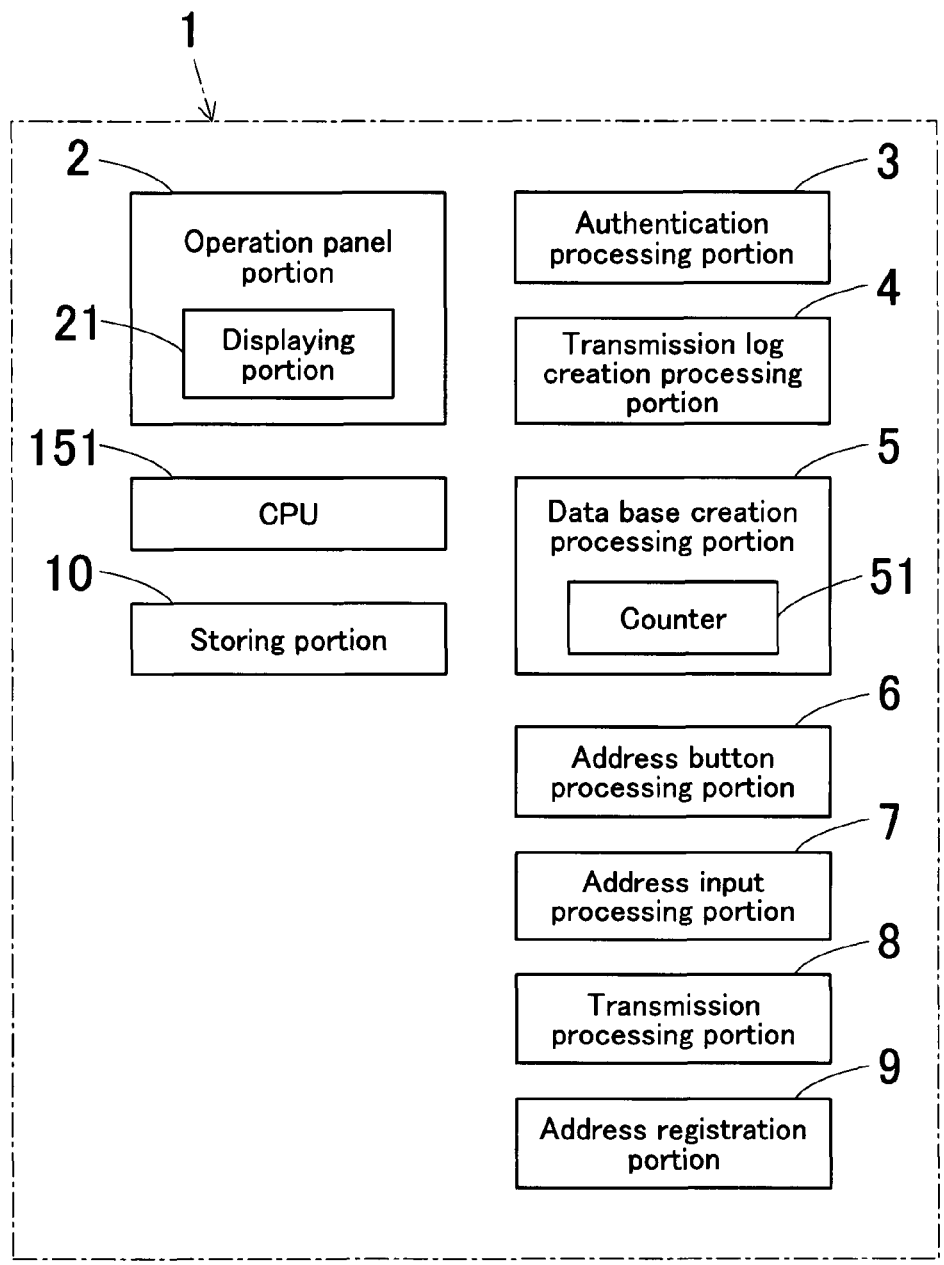
FIG. 2 is a block diagram showing the structure of the characteristic portion of the MFP.

FIG. 2 is a block diagram showing the structure of the characteristic portion of this MFP 1.

As shown in FIG. 2, this MFP 1 is equipped with an operation panel portion 2, an authentication processing portion 3, a transmission log creation processing portion 4, a data base creation processing portion 5, an address button processing portion 6, an address input processing portion 7, a transmission processing portion 8, an address registration portion 9, a storing portion 10, and a CPU 151.

The operation panel portion 2 is equipped with a displaying portion 21 for displaying, e.g., a key operating portion (not illustrated) and an address setting screen (not illustrated). The displaying portion 21 is made of the aforementioned touch-sensitive panel type LCD.

The authentication processing portion 3 is for executing authentication of an operating user. That is, upon input of authentication information, such as, e.g., a user ID and/or a user password, by a user at the time of using the MFP 1, the authentication processing portion 3 collates the inputted authentication information with previously registered authentication information to discriminate whether the user is allowed to use the MFP 1. In place of the authentication using a user ID and/or a password, the authentication can be performed by biometrics, such as, e.g., fingerprint authentication.

The transmission log creation processing portion 4 is for creating a transmission log file (transmission history).

The data base creation processing portion 5 is configured to acquire the information on the type of transmission (Fax or E-mail), the address and the user who transmitted, based on the created log file and create a transmission history data base. This data base creation processing portion 5 is equipped with a counter 51 which counts the number of transmissions to addresses (i.e., the number of using addresses) included in the log file for every address.

Furthermore, the data base creation processing portion 5 is configured so that a threshold for performing an automatic registration can be set to the number of transmissions to an address counted by the counter 51.

As shown in the transmission history data base of FIGS. 3(A) to 3(D), the information on whether or not an automatic registration is set, the type of transmission, the set threshold, the number of counts by the counter 51, and the user ("transmitted user" in FIG. 3) who transmitted to the address are correlated every address and stored as a transmission date base in the storing portion 10. The contents of the transmission history data base stored in the storing portion 10 will be updated by the data base creation processing portion 5 every time a user performs a transmission.

The address button processing portion 6 automatically registers an address whose number of counts stored in the transmission history data base exceeded the set threshold. As will be explained later, the automatically registered addresses will be displayed on the address setting screen as address abbreviated buttons (one-touch buttons), or some automatically registered addresses corresponding to a part of the inputted address will be displayed as candidate addresses when a part of an address is directly inputted. The type of displaying addresses corresponding to a part of the inputted address when a part of an address is directly inputted will be referred to as "auto filtering system."

The address input processing portion 7 performs the input processing in the auto filtering system. The transmission processing portion 8 is for executing a data file transmission to a set address.

The address registration portion 9 is for preliminary registering an address button based on a user's intentional registration operation.

The authentication processing portion 3, the transmission log creation processing portion 4, the data base creation processing portion 5, the address button processing portion 6, the address input processing portion 7, the transmission processing portion 8, and the address registration portion 9 will function by the operation of the CPU 151 in accordance with the operation program recorded in a storage media, such as, e.g., a ROM (not illustrated).

Next, the schematic operation of the MFP 1 at the time of executing a transmission by a user using the MFP 1 will be explained with reference to FIGS. 3 to 6.

FIGS. 3(A) to 3(D) show the contents of the transmission history data base created by the data base creation processing section 5.

As shown in FIG. 3(A), in this data base, as explained above, the information on whether or not an automatic registration is set, the type of transmission, the threshold, the number of counts, and the user name who had ever transmitted are stored in a correlated manner every address.

The following explanation will be addressed to the case in which a user A transmitted to an e-mail to an address "kimura@aaa.ne.jp" (hereinafter abbreviated to "kimura") in the aforementioned state.

Initially, it is confirmed whether or not the transmitted address exists in the data base. If it exists, the number of counts of the address "kimura" will be incremented by 1 as shown in FIG. 3(B). An additional registration of the user A will not be newly performed since the user A has been already registered as a user who had ever transmitted to the address "kimura."

When the number of counts of the address "kimura" has reached the threshold by being incremented by 1 as shown in FIG. 3(B), the item of "Automatic Registration" will be changed from "OFF" to "ON" as shown in FIG. 3(C). As a result, the address button processing portion 6 automatically registers the address "kimura." Therefore, when the user A, B, or C who has ever transmitted to the address "kimura" performs a date transmission to the address "kimura" in the future, an abbreviated button (one-touch button) of the address "kimura" will be displayed on the address setting screen, or the address "kimura" will be displayed on the address setting screen by an auto filtering system.

On the other hand, when the user D who had never transmitted to the address "kimura" performs an e-mail transmission to the address "kimura", as shown in Fig. (D), the number of counts of the address "kimura" will be incremented by 1 and the user D will be additionally registered as a user who had ever transmitted to the address "kimura."

Now, the difference between users to whom automatically registered addresses will be displayed and users to whom automatically registered addresses will not be displayed will be further detailed based on the following scenario.

"Preconditions"

(1) The user A performs a date transmission by Scan-to-E-mail to the address "kimura" using the MFP 1 three times per month (2) The user B performs a date transmission by Scan-to-E-mail to the address "kimura" using the MFP 1 five times per month (3) The user A and the user B have not intentionally registered the address "kimura" since they perform only several data transmissions per month (4) The transmission history data base shown in FIG. 3 has been repeatedly updated due to the use by many users, and the "Automatic Registration" on the address "kimura" has been turned "ON," i.e., the address "kimura" has been already registered automatically (see FIG. 3(C)).

Under the preconditions, it is assumed that the user A normally performs a data transmission to the address "kimura" next month.

Initially, the user A logs into the MFP 1 via authentication.

Subsequently, the user A confirms the display of the address setting screen on the displaying portion 21. Since the transmission history of the user A includes the address "kimura," as shown in the screen D2 in FIG. 5, in addition to the intentionally registered addresses B1 which will be commonly displayed to all users, an abbreviated button B2 of the address "kimura" is additionally displayed.

Figure 6:
FIG. 6 shows still another explanatory display of the address setting screen.

Here, the user A can touch the abbreviated button to select the address. It is assumed, however, that the user A starts directly inputting the address on the direct input screen shown in FIG. 6 without being aware of the abbreviated button. When "ki" is inputted by the user A as a part of an address, as shown in FIG. 6, address candidates will be displayed by the auto filtering sytem. In this embodiment, the address candidates to be displayed are limited to addresses that the user A had ever transmitted and "Automatic Registration" is turned "ON." For example, "kitamura", "kimura", etc., beginning from "ki" will be displayed. Further input operation causes narrowing of the displayed candidate addresses.

The user A selects the address "kimura" from the displayed candidates and performs an e-mail transmission.

Next, it is assumed that a user D having no experience of transmission to the address "kimura" performs an e-mail transmission to the address "kimura" for the first time. An authentication is performed at the MFP 1. When authenticated, the user D is permitted to log into the MFP 1.

Figure 4:
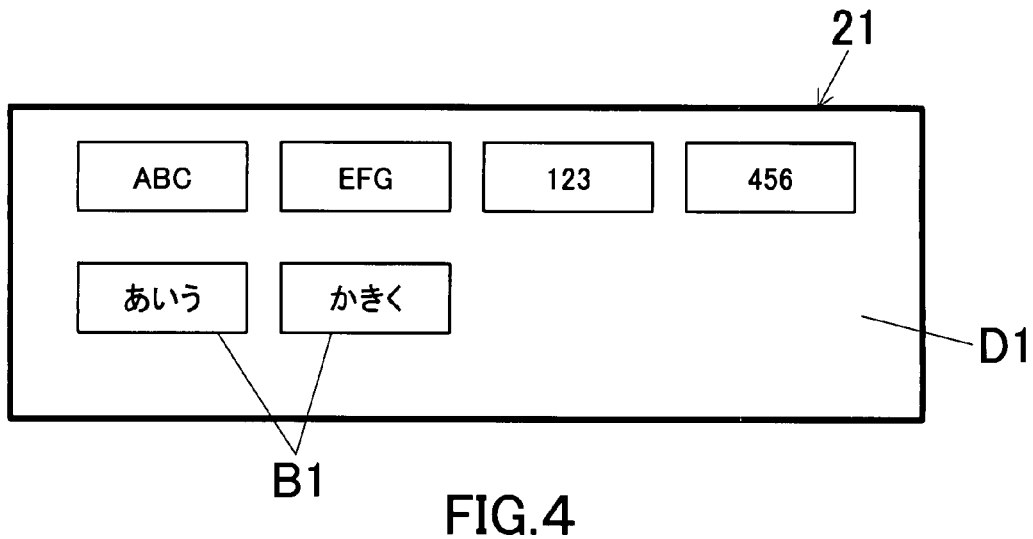
FIG. 4 shows an explanatory display of an address setting screen displayed on the displaying portion of the operation panel portion.

Subsequently, the user D confirms the display of the address setting screen. In this case, as shown in FIG. 4, only common abbreviated buttons B1 are displayed. Since there is no transmission history to the address "kimura" by the user D, the "abbreviated button B2 of the address "kimura" is not displayed. Direct address input operation does not cause a display of address candidates.

After inputting the address, an E-mail transmission to the address "kumura" is performed. At this time, the data in which the user D performed an e-mail transmission to the address "kimura" remains in the transmission log created by the transmission log creation processing portion 4.

Based on the transmission log, the transmission history data base is updated by the data base creation processing portion 5. As shown in FIG. 3(D), the numbers of counts on the address "kimura" is incremented by 1, and the user D is added as a user who has ever transmitted to the address "kimura." Accordingly, from the next time, the user D can enjoy the benefits of the address display by the automatic registration like the user A.

Thus, even if the address is an address automatically registered since the number of past transmissions to the address has reached the threshold, as to the user with no transmission history to the address, i.e., the user who has not contributed to the automatic registration, the address will not be displayed on the address setting screen. This prevents an accidental transmission to a similar address by a user with no transmission history to the address and disclosure of the other persons' transmission histories which deteriorates the security.

Furthermore, in the case of a user who has not transmitted to an automatically registered address, if the user once transmits to the address, the address will be automatically displayed on the address setting screen by automatic registration from the next time. This results in an user-friendly apparatus not only for a user who has many chances of a transmission to the address but also for a user who has fewer chances thereof.

Figure 7:
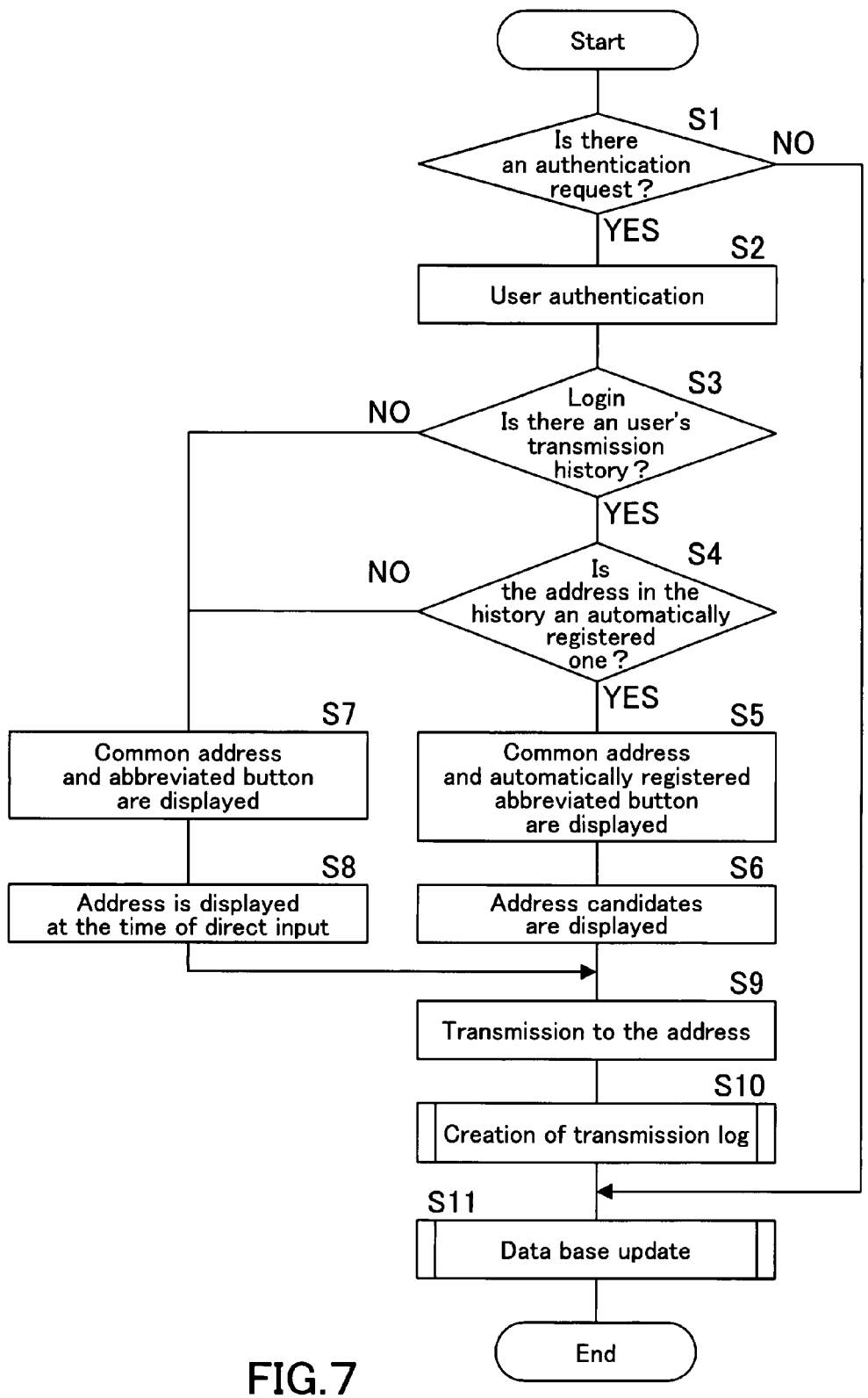
FIG. 7 is a flowchart showing the processing performed by the MFP when a user performs a transmission to a certain address.

FIG. 7 is a flowchart showing the processing of the MFP 1 at the time of performing a transmission to an address by a user. This processing is executed by the operation of the CPU 15 in accordance with the operation program recorded in a recording medium (not illustrate).

In FIG. 7, at Step 1, it is discriminated whether an authentication is requested by a user. If there is no authentication request ("NO" at Step S1), the routine proceeds to the data base update processing of Step S11.

If there is an authentication request ("YES" at Step S1), a user authentication will be performed at Step 2. When the authentication is performed successfully, the operation user is specified.

Next, at Step S3, it is discriminated whether there is a transmission history of the user who logged, i.e., whether the user had ever transmitted in the past. If there is a transmission history of the user ("YES" at Step S3), it is discriminated at Step S4 whether the address in the transmission history has been automatically registered.

Figure 5:
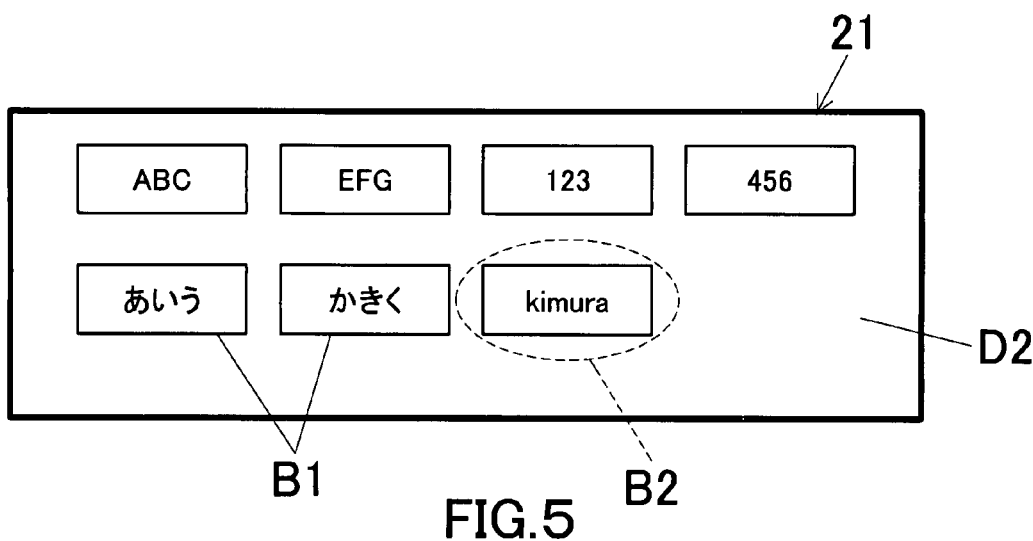
FIG. 5 shows another explanatory display of the address setting screen.

If it has been automatically registered ("YES" at Step S4), at Step S5, the automatically registered address abbreviated button B2 is displayed on the address setting screen displayed on the displaying portion 21 of the operation panel portion 2 in addition to address abbreviated buttons B1 to be commonly displayed to all users (see FIG. 5).

In cases where the user directly inputs the automatically registered address by keystrokes on the operation panel portion 2 regardless of the display of the address abbreviated buttons, address candidates will be displayed by the auto filtering system at Step S6. In detail, every time one character is inputted, the destination input processing portion 7 correlates the partially inputted portion of the address with addresses registered in the transmission history data base to display correlated addresses as input candidates in a selectable manner if any (see FIG. 6), and the routine proceeds to Step S9.

On the other hand, at Step S3, if there is no transmission history of the user ("NO" at Step 3), the routine proceeds to Step S7 and only the address abbreviated button B1 common to all users will be displayed (see FIG. 4). Furthermore, at Step S4, even if the address in the transmission history is not an automatically reregistered address ("NO" at Step S4), the routine proceeds to Step S7, and only the address abbreviated buttons B1 common to all users will be displayed.

As will be apparent from the above, in cases where the user is not an user who had never transmitted before or the address is an address which has not been automatically registered even if the user had ever transmitted before, automatically registered address abbreviated buttons will not be displayed and that the auto filtering system display will not be available.

In this state, when the user directly inputs an address by keystrokes on the operation panel portion 2 without using address abbreviated buttons common to all users, the inputted address is displayed at Step S8, then the routine proceeds to Step S9.

At Step S9, a transmission is performed via the transmission processing portion 8 to the address selected or inputted at any one of Step S5 to Step S8. Then, at Step S10, creation of a transmission log file is performed via the transmission log creation processing portion 4 based on the transmission result.

Next, at Step S11, after the renewal of the transmission history data base via the data base creation processing portion 5, the routine terminates.

Figure 8:
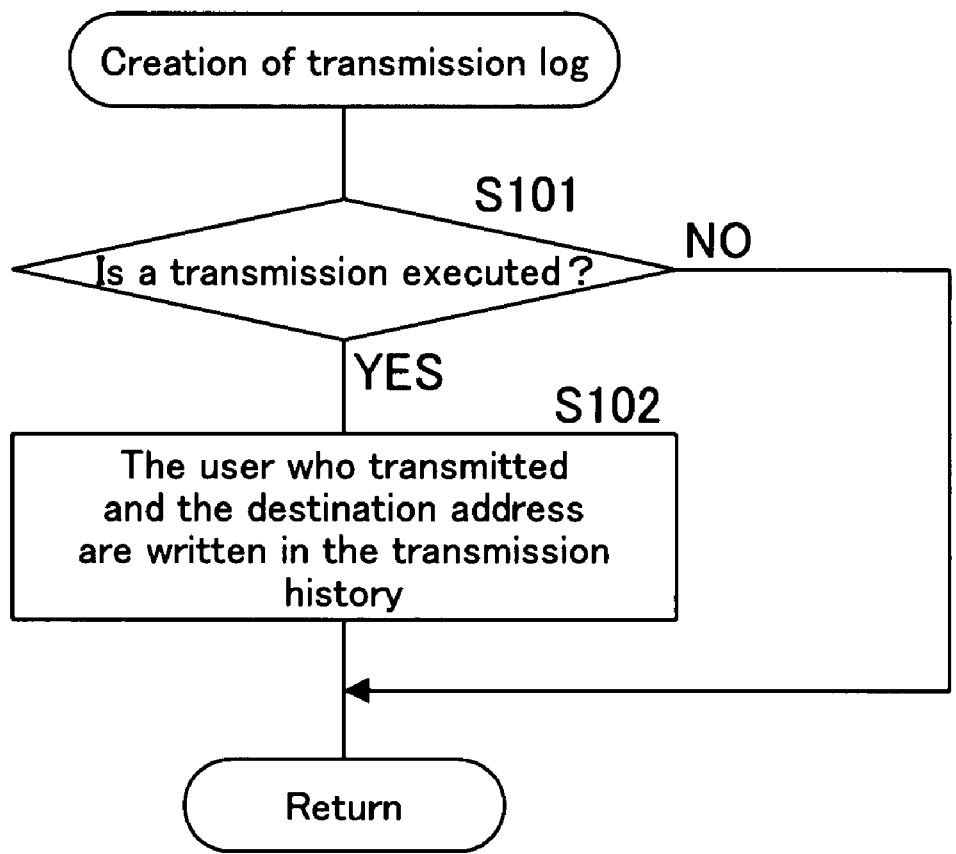
FIG. 8 is a flowchart showing the subroutine of the transmission log creation processing (Step S10) shown in FIG. 7.

FIG. 8 is a flowchart showing the subroutine of the transmission log creation processing (Step S10) shown in FIG. 7.

In FIG. 8, at Step S101, it is discriminated whether a transmission was executed. If a transmission was executed ("YES" at Step S101), after writing the user who transmitted and the address in the transmission history at Step S102, the routine returns. If no transmission was executed ("NO" at Step S101), the routine returns as it is.

Figure 9:
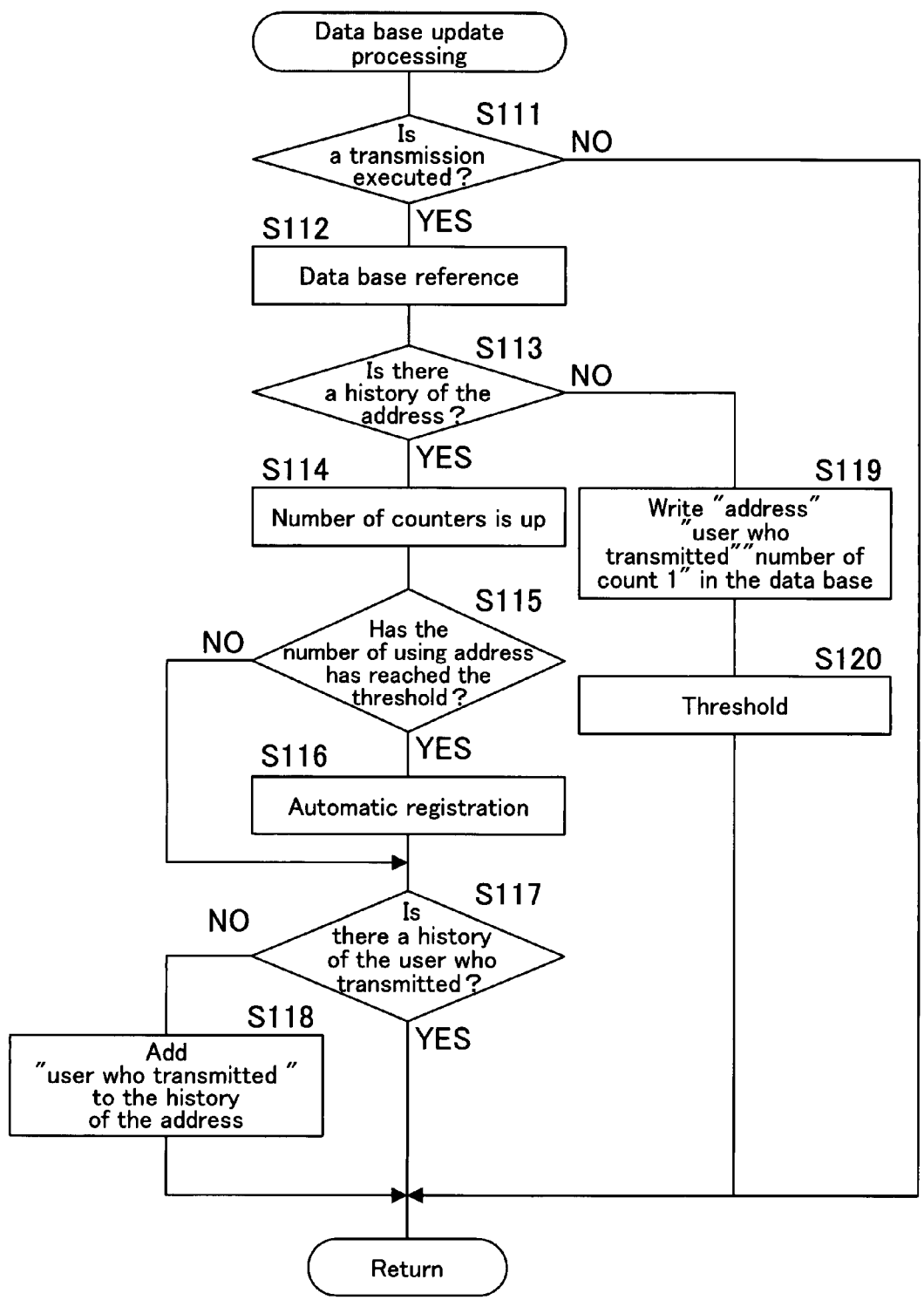
FIG. 9 is a flowchart showing the subroutine of the data base update processing (Step S11) shown in FIG. 7.

FIG. 9 is a flowchart showing the subroutine of the data base update processing (Step S11) in FIG. 7.

At Step S111, it is discriminated whether a transmission was executed. If no transmission has been performed ("NO" at Step S111), the routine returns as it is since no updating is required. On the other hand, if a transmission has been executed ("YES" at Step S111), the transmission history date base is referred at Step S112, and it is discriminated at Step S113 whether there exists a transmission history of the address to which the transmission was executed. If no transmission history exists ("NO" at Step S113), after writing "the address," "the user who transmitted," "the number of counts", etc., in the data base in order to register them as new information at Step S119, a threshold to the number of counts is set at Step S120, and then the routine returns.

If the transmission history exists ("YES" at Step S113), the number of counts of the data base is incremented by 1 at Step S114. Then, at Step S115, it is discriminated whether the number of counts, i.e., the number of transmissions to the address (the number of using the address) has reached the threshold. If it has reached the threshold ("YES" at Step S115), the setting of "Automatic Registration" is changed to "ON" about the address at Step S116 and the address is automatically registered, and then the routine proceeds to Step S117. On the other hand, if it has not reached the threshold ("NO" at Step S115), the routine proceeds to Step S117 as it is.

At Step S117, it is discriminated whether the user has been registered as a user who has ever transmitted to the address. If registered ("YES" at Step S117), the routine returns as it is since it is not necessary to register again. If not registered ("NO" at Step S117), the user is additionally registered as a user who has ever transmitted at Step S118, and then the routine returns.

Figure 10:
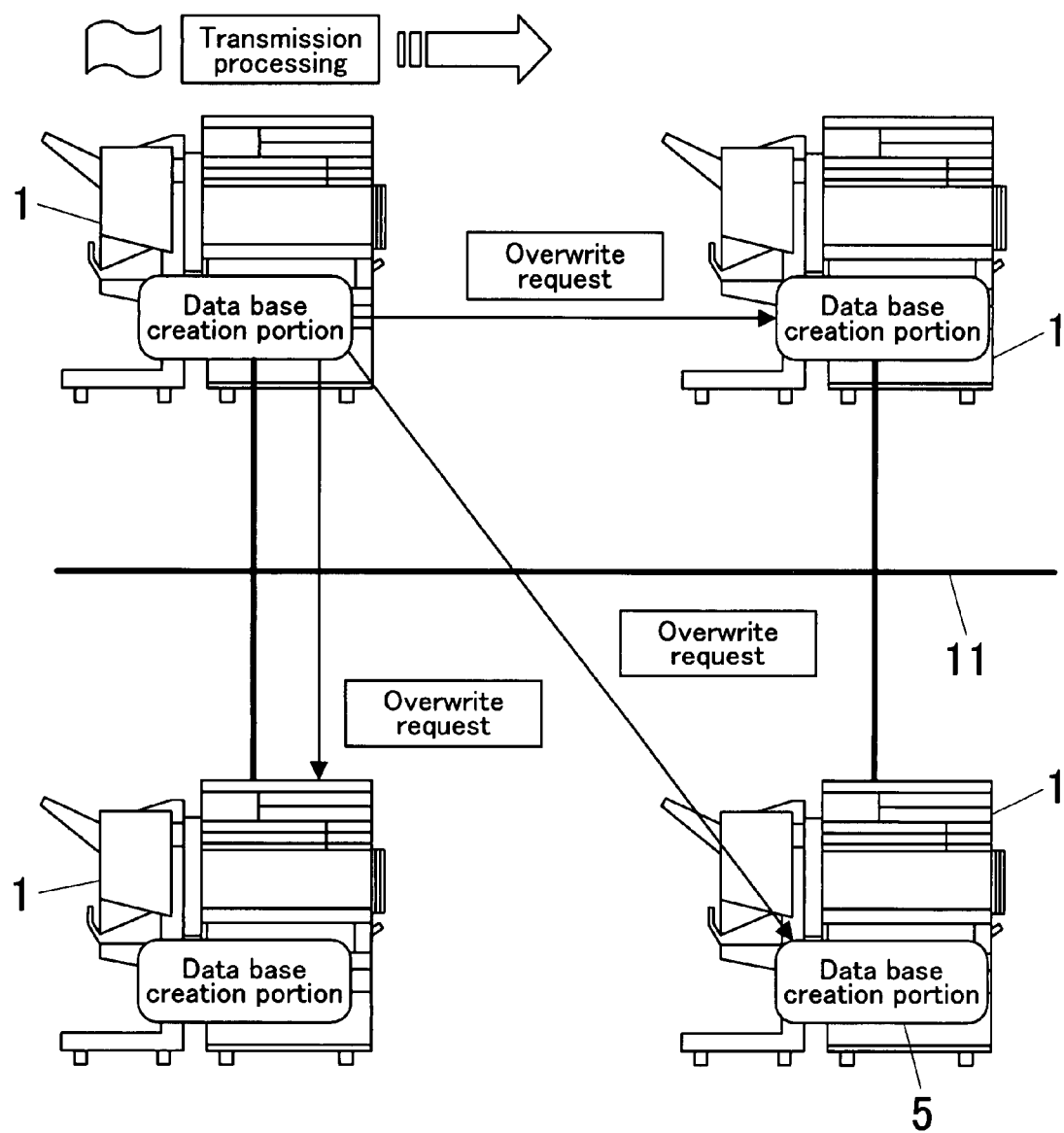
FIG. 10 is a network diagram showing the updating status of the data base according to another embodiment of the present invention.

FIG. 10 shows another embodiment of the present invention.

In FIG. 10, a plurality of MFPs 1 (e.g., four MFPs in this embodiment) are connected via a network 11.

In this case, when a transmission history data base stored by the storing portion 10 of one of MFPs 1 is updated, the updating (overwriting) of the transmission history data base of the other MFPs 1 is also performed in synchronization with the updating of the one of MFPs 1. Thus, when a benefit of displaying an automatically registered address is given to a user who performed a transmission in one of MFPs 1, the same benefit is also automatically given to the users of the other MFPs 1.

Figure 11:
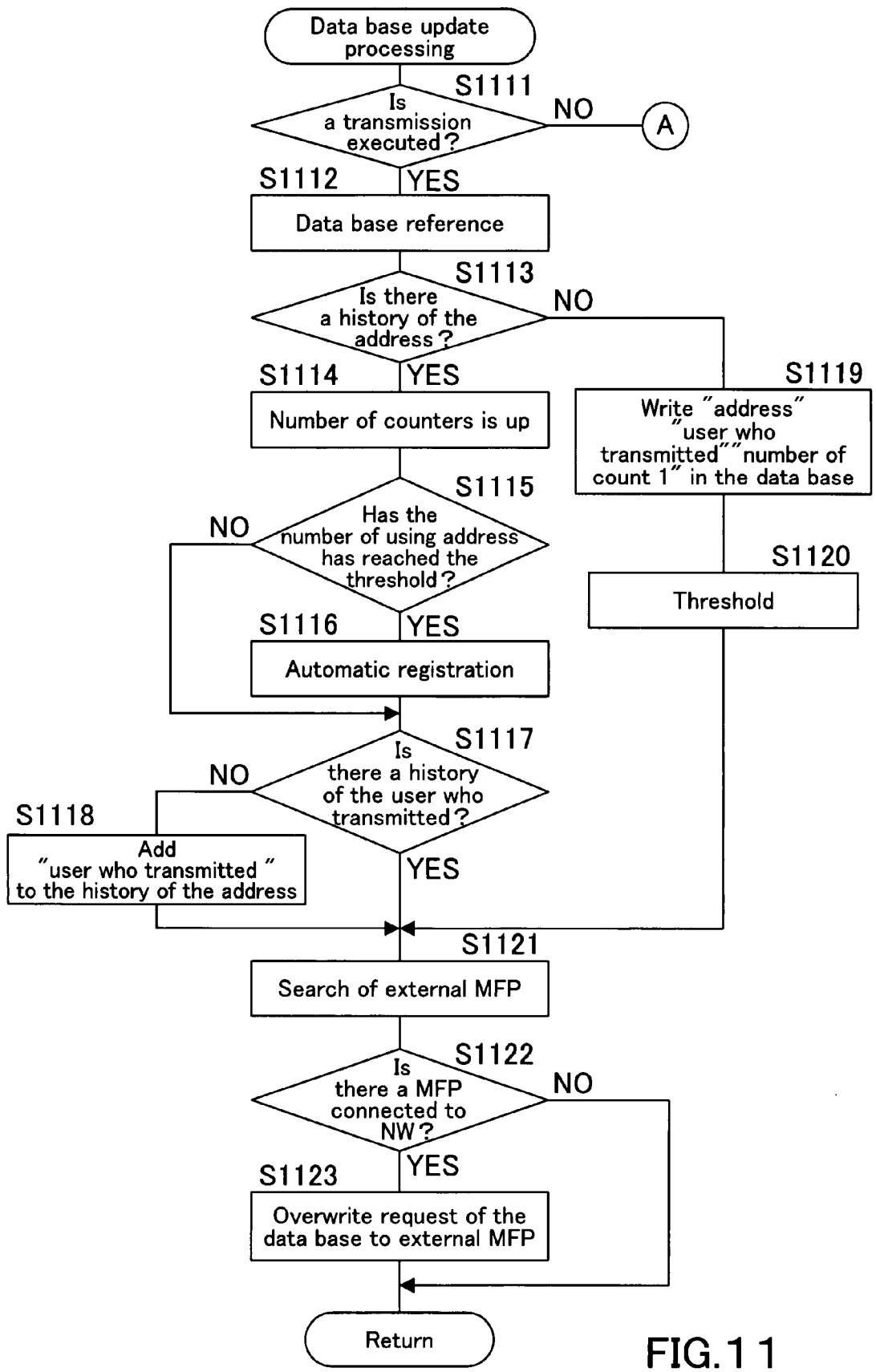
FIG. 11 is a flowchart showing the data base update processing in the MFP shown in FIG. 10.

FIG. 11 shows the flowchart of the data base update processing performed in the MFP 1 in the embodiment shown in FIG. 10 to be executed as the data base update processing of Step S11 in the flowchart of FIG. 7.

In FIG. 11, it is discriminated at Step S1111 whether a transmission was executed. If no transmission was executed ("NO" at Step S1111), the routine proceeds to Step S1124 of FIG. 12. If a transmission was executed ("YES" at Step S1111), the transmission history data base is referred at Step S1112, and it is discriminated at Step S1113 whether there exists a transmission history of the address to which the transmission was performed. If no transmission history exists ("NO" at Step S1113), after writing necessary information, such as, e.g., "the address," "the user who transmitted," "the number of counts," in the data base in order to register them as new information at Step S1119, a threshold to the number of counts is set at Step S1120, then the routine proceeds to Step S1121.

If the transmission history exists ("YES" at Step S1113), the number of counts of the data base is incremented by 1 at Step S1114. Then, at Step S1115, it is discriminated whether the number of counts, i.e., the number of transmissions to the address (the number of using the address) has reached the threshold. If it has reached the threshold ("YES" at Step S1115), the setting of "Automatic Registration" is changed to "ON" on the address at Step S1116 and the address is automatically registered, and then the routine proceeds to Step S1117. On the other hand, if it has not reached the threshold ("NO" at Step S1115), the routine proceeds to Step S1117 as it is.

At Step S1117, it is discriminated whether the user has been registered as a user who has ever transmitted to the address. If registered ("YES" at Step S1117), the routine proceeds to Step S1121 since it is not necessary to register again. If not registered ("NO" at Step S1117), the user is additionally registered as a user who have ever transmitted at Step S1118, and then the routine proceeds to Step S1121.

At Step S1121, other external MFPs 1 connected to the network 11 are searched. At Step S1122, it is discriminated whether there are other MFPs 1 connected to the network 11 based on the search result. If there are external MFPs 1 connected to the network 11 ("YES" at Step S1122), after transmitting a transmission history data base overwrite (update) request to the external MFPs 1 at Step S1123, the routine returns. If there is no external MFP 1 connected to the network 11 ("NO" at Step S1122), the routine returns as it is.

As will be understood from the above, when a transmitting history data base is updated, a data base overwrite request will be transmitted to the other external MFPs 1. Therefore, the other MFPs 1 which received this request will update its own data base, enabling data base sharing.

Figure 12:
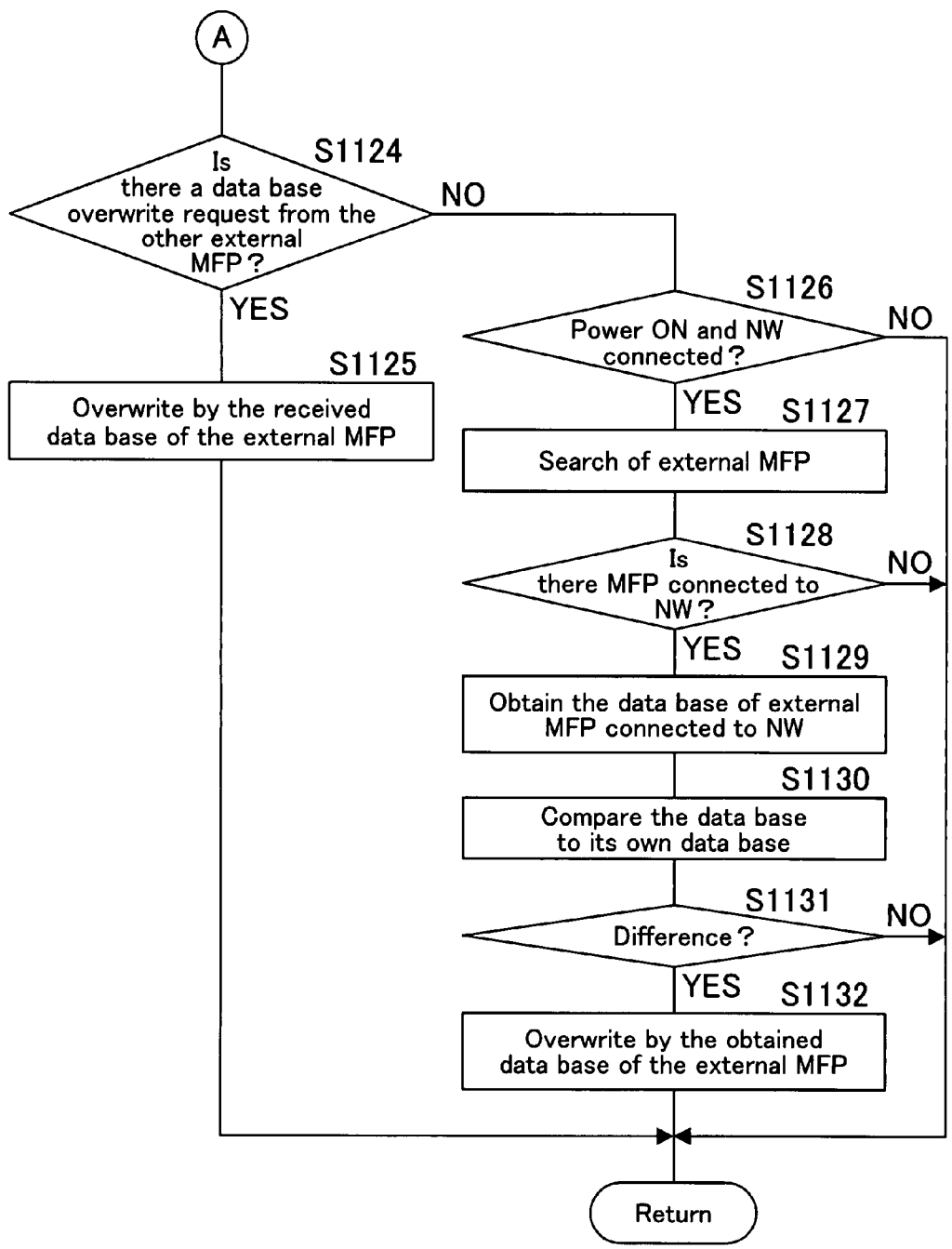
FIG. 12 is a flowchart following from FIG. 11.

On the other hand, in FIG. 12, it is discriminated at Step S1124 whether there was a data base overwrite (update) request from the other external MFPs 1 connected to the network 11. If there was a data base overwrite request from the other external MFP 1 ("YES" at Step S1124), its own data base is updated by the received data base of the other external MFP 1. If there was no data base overwrite request from the other external MFP 1("NO" at Step S1124), the routine proceeds to Step 1126.

At Step S1126, it is discriminated whether the power supply is turned on and the MFP 1 is connected to the network 11. If the power supply is turned on and the MFP 1 is connected to the network 11 ("YES" at S1126), after searching external MFPs 1 at Step S1127, the routine proceeds to Step S1128. Even if the power supply is turned on, if no MFP 1 is connected to the network 11 ("NO" at Step S1126), the routine returns as it is.

At Step S1128, it is discriminated whether there is an external MFP 1 connected to the network 11 as a result of the search. If there is an external MFP 11 connected to the network 11 (YES" at Step S1128), at Step S1129, the transmission history data base is acquired from the external MFP 1, and compared to the contents of its own data base at Step S1130.

Next, at Step S1131, it is discriminated whether there is any difference between the data base of the external MFP 1 and its own data base. If there is any difference ("YES" at Step S1131), its own data base is overwritten by the acquired data base at Step S1132, and the routine returns.

If there is no MFP 1 connected to the network at Step S1128 ("NO" at Step S1128), or if there is no difference between the data base of the external MFP 1 and its own data base ("NO" at Step S1131), the routine returns as it is.

As will be apparent from the above, when the transmission history data base is updated by any one of MFPs 1 on the network 11, or if the power supply of the MFP 1 is turned ON and the MFP 1 is connected to the network 11, the data base will be updated.

In each of the aforementioned embodiments, an MFP 1 was exemplified as a data transmission apparatus. It should be understood that, however, the present invention is applicable to any other data transmission apparatus, such as, e.g., a facsimile dedicated machine.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims an not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A data transmission apparatus, comprising:
   a transmitting portion capable of transmitting data to an address set by a user's transmission operation;
   an authenticating portion for executing authentication of the user;
   a counter portion for counting the number of past transmissions for an address;
   a storing portion for storing a transmission history including the counted number of past transmissions in an updatable manner;
   a registering portion for automatically registering an address whose number of past transmissions by all users has reached a prescribed number, as an automatically registered address;
   a displaying portion for displaying an address setting screen;
   a discrimination portion for discriminating whether, based on the transmission history, an operating user who is among the all users and logs into the data transmission apparatus through the authenticating portion has previously transmitted to the automatically registered address; and
   a controlling portion for making the displaying portion display the automatically registered address in a selectable manner on the address setting screen of the displaying portion only when it is discriminated by the discrimination portion that there is the transmission history that the operating user had transmitted to the automatically registered address.

2. The data transmission apparatus as recited in claim 1, wherein the controlling portion makes the displaying portion display the automatically registered address as a one-touch button.

3. The data transmission apparatus as recited in claim 1, wherein the controlling portion makes the displaying portion display address candidates in a selectable manner every time a part of an address is inputted.

4. The data transmission apparatus as recited in claim 1, further comprising an updating portion for updating the transmission history stored in the storing portion of its own apparatus so that the transmission history becomes the same in contents as an updated transmission history of other data transmission apparatus connected to its own apparatus when a transmission history of the other data transmission apparatus is updated.

5. The data transmission apparatus as recited in claim 1, wherein, when the transmission history stored in the storing portion is updated, in order to make a transmission history of other data transmission apparatus connected to its own apparatus via a network the same in contents as the updated transmission history of its own apparatus, a transmission history update request is transmitted to the other data transmission apparatus.

6. An address setting method, including the steps of:
   transmitting data to an address set by a user's transmission operation;
   an authenticating portion for executing authentication of the user;
   counting the number of past transmissions for an address;
   storing a transmission history including the counted number of past transmissions in a storing portion;
   automatically registering an address whose number of past transmissions by all users has reached a prescribed number, as an automatically registered address;
   displaying an address setting screen on a displaying portion;
   discriminating whether, based on the transmission history, an operating user who is among the all users and logs into the data transmission apparatus through the authenticating portion had transmitted to the automatically registered address; and
   displaying the automatically registered address on the address setting screen of the displaying portion only when it is discriminated that there is the transmission history that the operating user had transmitted to the automatically registered address.

7. The address setting method as recited in claim 6, wherein the controlling step makes the displaying portion display the automatically registered address as a one-touch button.

8. The address setting method as recited in claim 6, wherein the controlling step makes the displaying portion display address candidates in a selectable manner every time a part of an address is inputted.

9. The address setting method as recited in claim 6, further comprising a step of updating the transmission history stored in the storing portion of its own apparatus so that the transmission history becomes the same in contents as an updated transmission history of other data transmission apparatus connected to its own apparatus via a network when a transmission history of the other data transmission apparatus is updated.

10. The address setting method as recited in claim 6, further comprising a step of transmitting a transmission history update request to other data transmission apparatus connected to its own apparatus via a network in order to make the transmission history of the other data transmission apparatus the same in contents as the updated transmission history of its own apparatus when the transmission history stored in the storing portion of its own apparatus is updated.

11. A nontransitory computer readable medium encoded with an address setting program for making a computer of a data transmission apparatus execute the step of:
   transmitting data to an address set by a user's transmission, operation;
   an authenticating portion for executing authentication of the user;
   counting the number of past transmissions for an address;
   storing a transmission history including the counted number of past transmissions in a storing portion;
   automatically registering an address whose number of past transmissions by all users has reached a prescribed number, as an automatically registered address;
   displaying an address setting screen on a displaying portion;
   discriminating whether, based on the transmission history, an operating user who is among the all users and logs into the data transmission apparatus through the authenticating portion had transmitted to the automatically registered address; and
   displaying the automatically registered address on the address setting screen of the displaying portion only when it is discriminated that there is the transmission history that the operating user had transmitted to the automatically registered address.

12. The nontransitory computer readable medium as recited in claim 11, wherein the controlling step makes the computer execute displaying processing for displaying the automatically registered address as a one-touch button.

13. The nontransitory computer readable medium as recited in claim 11, wherein the program makes the computer execute processing of displaying address candidates in a selectable manner every time a part of an address is inputted.

14. The nontransitory computer readable medium as recited in claim 11, wherein the program further makes the computer execute an updating step for updating the transmission history stored in the storing portion of its own apparatus so that the transmission history becomes the same in contents as the updated transmission history of other data transmission apparatus connected to its own apparatus via a network when a transmission history of the other data transmission apparatus is updated.

15. The nontransitory computer readable medium as recited in claim 11, wherein the program makes the computer further execute a transmission step of transmitting a transmission history update request to other data transmission apparatus connected to its own apparatus via a network in order to make the transmission history of the other data transmission apparatus the same in contents as the updated transmission history of its own apparatus when the transmission history stored in the storing portion of its own apparatus is updated.

16. The data transmission apparatus as recited in claim 1, wherein the storing portion stores the transmission history as a transmission history database, and the discrimination portion discriminates whether the transmission history database has the transmission history that the user operating to transmit had transmitted to the automatically registered address.

17. The data transmission apparatus as recited in claim 1, wherein transmission history has the counted number with the address and the user who had transmitted data to the address for each address.

\* \* \* \* \*